US012518234B2

(12) United States Patent
Perryman et al.

(10) Patent No.: US 12,518,234 B2
(45) Date of Patent: *Jan. 6, 2026

(54) CONVERSATIONAL BUSINESS TOOL

(71) Applicant: Kinaxis Inc., Ottawa (CA)

(72) Inventors: Olivia Margot Perryman, Ottawa (CA); Drew Blackmore, Ottawa (CA); Marcio Oliveira Almeida, Ottawa (CA)

(73) Assignee: Kinaxis Inc., Ottawa (CA)

(*) Notice: Subject to any disclaimer, the term of this patent is extended or adjusted under 35 U.S.C. 154(b) by 43 days.

This patent is subject to a terminal disclaimer.

(21) Appl. No.: 18/458,409

(22) Filed: Aug. 30, 2023

(65) Prior Publication Data
US 2024/0013129 A1 Jan. 11, 2024

Related U.S. Application Data

(63) Continuation of application No. 18/456,378, filed on Aug. 25, 2023, which is a continuation of application (Continued)

(51) Int. Cl.
G06Q 10/0639 (2023.01)
G06F 16/242 (2019.01)
(Continued)

(52) U.S. Cl.
CPC ..... *G06Q 10/06393* (2013.01); *G06F 16/243* (2019.01); *G06F 16/3344* (2019.01); *G06F 40/30* (2020.01); *G06Q 10/06315* (2013.01)

(58) Field of Classification Search
CPC ........ G06Q 10/06393; G06Q 10/06315; G06F 16/243; G06F 16/3344; G06F 40/30
See application file for complete search history.

(56) References Cited

U.S. PATENT DOCUMENTS 9,977,808 B2 5/2018 Sharma et al.
9,996,531 B1 6/2018 Parastatidis et al.
(Continued)

FOREIGN PATENT DOCUMENTS

CN 109002465 B * 3/2022 ........... G06F 16/243
EP 3844694 A1 7/2021
(Continued)

OTHER PUBLICATIONS

L. V. Subramaniam, T. A. Faruquie, S. Ikbal, S. Godbole and M. K. Mohania, "Business Intelligence from Voice of Customer," 2009 IEEE 25th International Conference on Data Engineering, Shanghai, China, 2009, pp. 1391-1402, doi: 10.1109/ICDE.2009.41. (Year: 2009).*

(Continued)

Primary Examiner — Jerry O'Connor
Assistant Examiner — Ayanna Minor
(74) Attorney, Agent, or Firm — Ruggiero McAllister & McMahon LLC

(57) ABSTRACT

A business analytics conversational tool comprising: a device comprising a communication channel, a natural language processor (NLP), a fulfillment application program interface (F-API), a database application program interface (D-API), and a business management database; wherein: the NLP receives a user-input from a user through the communication channel; the NLP deduces an intent of the user-input; the NLP communicates the intent to the F-API; the F-API communicates a request for data associated with the intent to the database via the D-API; the D-API communicates the data associated with the intent to the F-API; the F-API converts the data associated with the intent to conversational form and sends the conversational form for voice output through the communication channel.

18 Claims, 15 Drawing Sheets

Related U.S. Application Data

No. 17/866,721, filed on Jul. 18, 2022, now Pat. No. 11,775,913, which is a continuation of application No. 16/120,146, filed on Aug. 31, 2018, now Pat. No. 11,423,347.

(51) Int. Cl.
  *G06F 16/334* (2025.01)
  *G06F 40/30* (2020.01)
  *G06Q 10/0631* (2023.01)

(56) References Cited

U.S. PATENT DOCUMENTS

| | | | |
|---|---|---|---|
| 10,042,882 | B2 | 8/2018 | Li et al. |
| 10,108,605 | B1* | 10/2018 | Leighton ............... G06F 16/34 |
| 11,423,347 | B2 | 8/2022 | Perryman et al. |
| 2002/0138316 | A1* | 9/2002 | Katz ............... G06Q 10/06311 |
| | | | 705/7.31 |
| 2010/0004964 | A1 | 1/2010 | Heidasch |
| 2013/0311904 | A1* | 11/2013 | Tien ..................... G06Q 10/10 |
| | | | 715/753 |
| 2014/0100846 | A1 | 4/2014 | Haine et al. |
| 2014/0351232 | A1 | 11/2014 | Fan et al. |
| 2016/0371317 | A1* | 12/2016 | Sharma ............... G06Q 10/067 |
| 2017/0060868 | A1 | 3/2017 | Rais Ghasem et al. |
| 2017/0213157 | A1 | 7/2017 | Bugay et al. |
| 2018/0009369 | A1 | 1/2018 | Badkin |
| 2018/0012163 | A1* | 1/2018 | Smith .................... G06F 16/243 |

FOREIGN PATENT DOCUMENTS

| | | |
|---|---|---|
| JP | H01108375 A | 4/1989 |
| JP | 2002523842 A | 7/2002 |
| JP | 2003044646 A | 2/2003 |
| JP | 2011008375 A | 1/2011 |
| JP | 2014116016 A | 6/2016 |
| JP | 2018045646 A | 3/2018 |
| WO | 2018009369 A1 | 1/2018 |
| WO | 2020041892 A1 | 3/2020 |

OTHER PUBLICATIONS

Canadian Patent Application No. 3110889, Office Action dated Oct. 5, 2022.
English translation of Office Action dated Oct. 15, 2021 from corresponding Japanese Patent Application No. 2021-536119.
European Patent Application No. 19854790.3, Extended European Search Report dated Apr. 4, 2022.
Indian Patent Application No. 202127012871, Office Action dated Feb. 7, 2022.
International Search Report from corresponding international application No. PCT/CA2019/051208.
Japan Patent Application No. JP2022-142292, Office Action dated Dec. 5, 2023 (English Translation Available).
Japanese Patent Application No. JP20210536119, Office Action dated Jun. 6, 2023.
U.S. Appl. No. 16/120,146, Final Office Action dated Nov. 23, 2021.
U.S. Appl. No. 16/120,146, Non-Final Office Action dated Jun. 30, 2021.
U.S. Appl. No. 16/120,146 Notice of Allowance dated Apr. 26, 2022.
U.S. Appl. No. 17/866,721, Notice of Allowance dated May 31, 2023.
U.S. Appl. No. 16/120,146, Notice of Allowance dated Jun. 21, 2022.
U.S. Appl. No. 17/866,721, Non-Final office Action dated Jan. 23, 2023.

* cited by examiner

NLP

- Identify intents
- Write sample utterances
- Training

Fulfillment define outstring as string //output to user define intent as string //identified request from user

- for each fulfillment request
  - until conversation ended
    - if first query
      - log in
    - end if
    - request data
    - if match intent to function
      - if entities then
        - add parameters
      - end if
      - call function
      - parse data
      - form response
      - respond(outstring)
    - else
      - respond("I don't understand")
    - end if
  - loop
- next

FIG. 2A

| Speaker | Conversational Turn | Notes |
|---|---|---|
| User | Ok Google, talk to Lens. | |
| Assistant | Alright, here's Lens. | |
| Lens | Hi! I'm Lens, your personal business assistant from Kinaxis. I keep an up-to-date report on your key metrics. Would you like to hear that now? | Suggestion Chips:<br><br>('Yes', 'What else can you do?') |
| User | Give me the report. | |
| Lens | Ok. Today's forecast shows that 2 metrics are on track, Inventory is at risk, and 2 metrics are critically low. Utilization is doing the worst; it's 20% below target. | Show table summary graphic. |
| User | How does it look moving forward? | |
| Lens | So far this quarter, utilization is 75%, but the target is 95%. Fortunately, by the end of the year, it will be back on track. | Leverage buckets for context. |
| User | Good. What about the other critical metric? | |
| Lens | Revenue is 18% below target. So far this quarter, it's $12.8M, but the target is 16M. At this rate, revenue will be 345M by the end of the year; that's below target by 16%. | Give initial summary in front of details if it isn't the context metric. |
| User | Do we know why? | |
| Lens | The biggest factor is a revenue shortfall in France. Revenue for the region is down by $7.7M. | Show pie chart of all factors |
| User | Any other causes? | |
| Lens | Cell Phones are down by $3.1M, and HDTVs by 2M. | List up to 3 contributing factors per ask. |
| User | Get me the regional manager for France. Tell them that we need to find a resolution by the end of the week. | |
| Lens | Andrew Bell is the regional manager in France. Here's your message to Andrew: "we need to find a resolution by the end of the week." Do you want to send it, or change it? | System recognizes that both a contact request and message were given. Jumps to review. |
| User | Send it. | |
| Lens | Message sent. I've added Andrew to a Rapid Reply Collaboration so they can respond. Do you want to hear about anything else? | |
| User | I'm done for now. | |
| Lens | Ok. Have a nice day! | |

FIG. 6

CONVERSATIONAL BUSINESS TOOL

CROSS-REFERENCE TO RELATED APPLICATIONS

This application is a continuation of U.S. patent application Ser. No. 18/456,378 filed Aug. 25, 2023, which is a continuation of U.S. patent application Ser. No. 17/866,721, filed Jul. 18, 2022, which is a continuation of U.S. patent application Ser. No. 16/120,146, filed Aug. 31, 2018 (issued as U.S. Pat. No. 11,423,347 B2); the entirety of each of which is hereby incorporated by reference.

TECHNICAL HELD

The present disclosure relates to the field of business management. In particular, it relates to use of a conversational user interface for obtaining information related to the business.

BACKGROUND

Business data related to supply chain management is often very detailed and complicated to understand or visualize. The total amount of data available is often far too large for one person to read all of it. Since there is so much data, choosing the relevant features from the data can be time-consuming and difficult.

Presenting the data poses a challenge since typical presentation methods (e.g. spreadsheets, charts) show raw numbers, whereas insights are left up to the reader to find. Furthermore, visualizations and graphs require trained skills to interpret meaningful results.

Therefore, reporting up-to-date, aggregated business data in an easily-digestible format would greatly improve efficiency in making business decisions to correct and/or improve the supply chain.

Currently, there are three main approaches to communicating aggregate business data: paper reports, phone or email communication, and interactive dashboards.

Paper reports have the problem that they are inflexible. Data cannot be filtered, modified or explored further. If more details are required or requested, a new report must be created. This uses up valuable time and financial resources. Often too much data is provided in these reports such that irrelevant details obscure important aspects and insights. However, if too little data is provided, the executive may miss out on critical information. Also, the data provided in a paper report is not live, i.e., it is not being updated in real-time. As such, the most up-to-date business metrics will not be available, thereby hindering decision-making processes. Furthermore, the data is often represented in the form of spreadsheets, graphs and other visualizations that require trained skills to gain insight. Learning to interpret these results to gain meaningful knowledge of the business state is a time-consuming and challenging process.

Phone or email communication can address the problem of up-to-date metrics. However, it comes at the cost of using human resources. For example, data scientists that report such information may not always be available for conversations and the results may be delayed.

Interactive dashboards are a popular approach since they are up-to-date and can be filtered or modified. However, these do not solve the issue of complicated visualizations and may require even more training to comprehend. Dashboards also introduce a new challenge of fitting all the relevant information on the screen of a device. This approach also does not allow the user to multitask while they consume their business metrics.

U.S. Pat. No. 9,977,808 B2 discloses intent based real-time analytical visualizations. Natural language processing is used to generate an analytical requirement statement from a received requirement statement (that is used to generate visualization analysis). The generated visualization analysis is displayed on a computer generated graphical user interface (GUI).

US2014351232 A1 discloses a method for accessing enterprise data using a natural language user interface. A mobile application converts voice data to text data, which is then used to generate a command for use by a business analytics engine or by an enterprise search engine. In either case, results are presented to the user on a user interface.

U.S. Pat. No. 9,996,531 B1 discloses methods, mediums, and systems for managing a conversation. The system includes a computer-implemented input interface for receipt of an input comprising information in natural language; a dialog manager configured to determine an intent of the input, determine information to fulfill the intent; a conversational understanding document that documents the intent and the identified information; and an output interface that forwards the conversational understanding document towards a task completion handler separate and distinct from the dialog manager.

US20180012163 discloses a method and system for providing sales information and insights through a conversational interface. The method and system processes data from data sources and analyzes the data to provide suggestions on how to improve the performance of the business.

U.S. Ser. No. 10/042,882 B2 discloses an analytics program interface for retrieving analytics data from a data sources. The method includes receiving a request to retrieve analytics data, issuing a first query for analytics data from a first data source; and issuing a second query for data from a second data source different from the first data source. The method can include providing the analytics data and the data.

It is thus advantageous to provide a conversational tool that is flexible, always available, up-to-date, easy to understand and provides only relevant information such as KPIs, business insights, anticipate future inquiries (i.e. requests for future data/metrics), and initiate collaboration to address problems in the supply chain.

SUMMARY

In accordance with one embodiment, a business analytics conversational tool comprising: a device comprising a communication channel, a natural language processor (NLP), a fulfillment application program interface (F-API), a database application program interface (D-API), and a business management database; wherein: the NLP receives a user-input from a user through the communication channel; the NLP deduces an intent of the user-input; the NLP communicates the intent to the F-API; the F-API communicates a request for data associated with the intent to the database via the D-API; the D-API communicates the data associated with the intent to the F-API; the F-API converts the data associated with the intent to conversational form and sends the conversational form for voice output through the communication channel.

In accordance with another embodiment, one or more computer-readable storage medium for executing a method for accessing business data and reporting an analysis thereof, the method comprising: receiving an oral query via a communication channel located in a device; converting the oral query to a command for communicating with a business database, performing a search and/or analysis of data in the database based on the command; retrieving the search and/or analysis results; and transmitting the search and/or analysis result in conversational form for voice output to the communication channel.

Disclosed herein is a conversational business tool that comprises a Natural Language Processing Model that is trained on business conversations; intelligent analytics to prioritize business insights; and data-driven speech that delivers insights in a conversational manner.

The conversational business tool may be integrated with a supply chain planning platform. A platform that provides rapid processing of business metrics and scenario simulations can be used to provide up-to-date analysis in a natural conversational flow when integrated with the conversational business tool. An example of a supply chain planning platform that provides rapid processing of business metrics and scenario simulations is disclosed in U.S. Pat. Nos. 7,610,212 B2; 8,015,044 B2; 9,292,573 B2; and U.S. Pub. No. 20130080200A1—all of which are incorporated herein by reference. Such a "rapid" platform is heretofore referred to as a "rapid response" supply chain planning platform. Such a conversation business tool can compare forecasts of customizable KPIs to planned targets using the scenario simulation functionality disclosed in U.S. Pat. Nos. 7,610,212 B2; 8,015,044 B2; 9,292,573 B2; and U.S. Pub. No. 20130080200A1 (all of which are incorporated herein by reference).

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF FIGURES

The foregoing and other advantages of the disclosure will become apparent upon reading the following detailed description and upon reference to the drawings.

FIG. 2A summarizes the function of an NLP and illustrates a pseudocode of an embodiment of the conversational business tool.

FIG. 6 illustrates a dialogue comprising a series of conversational turns in an embodiment of the conversational business tool, in which the modules shown in FIG. 5 are used.

Figure 1:
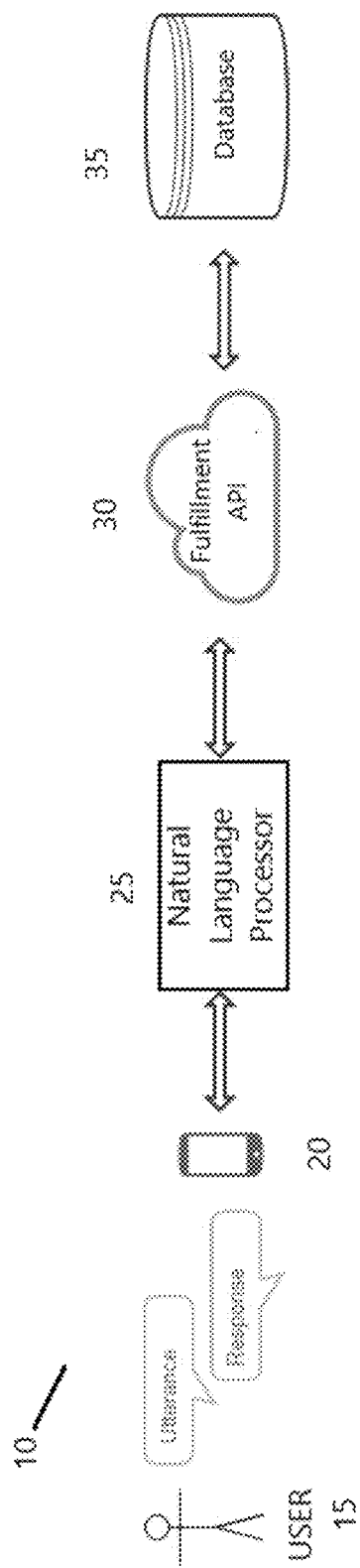
FIG. 1 illustrates an overview of a system architecture of an embodiment of the conversational business tool.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Disclosed herein is a conversational business tool that comprises a Natural Language Processing Model that is trained on business conversations; intelligent analytics to prioritize business insights; and data driven speech that delivers insights in a conversational manner.

Furthermore, by using a cloud service, the metric conversation business is "always-on," and calculating the latest metrics for each inquiry the user has. It can be used at any time of day and provides immediate answers. The tool can recalculate metrics, filter results and drill down to further details at the request of the user. Once the relevant data is obtained, it is processed into an easy-to-understand sentence maintaining the flow of a natural conversation.

The conversation business tool can check many possible filter combinations of the data to find trends and patterns in the data to communicate the interpretation of the results, not just the numbers. By checking forecasts in many different scenarios and time horizons, the conversation business tool may also able provide the user with early detection of potential issues and give indications of root causes to problems. The conversation business tool tracks what has been discussed to structure its responses and anticipate what will be asked next which can save the user time.

Due to the nature of the conversation, the amount of information the user can obtain is almost unlimited but also not overwhelming since the user is in control of what is being presented. Language is an interface that everyone can understand intuitively with no special training or courses needed. Within the same interface, the user may able to send messages to others in the company by starting collaborations. With integration into a mobile device, the user can multitask while checking KPIs and can access business data from anywhere.

Figure 2:
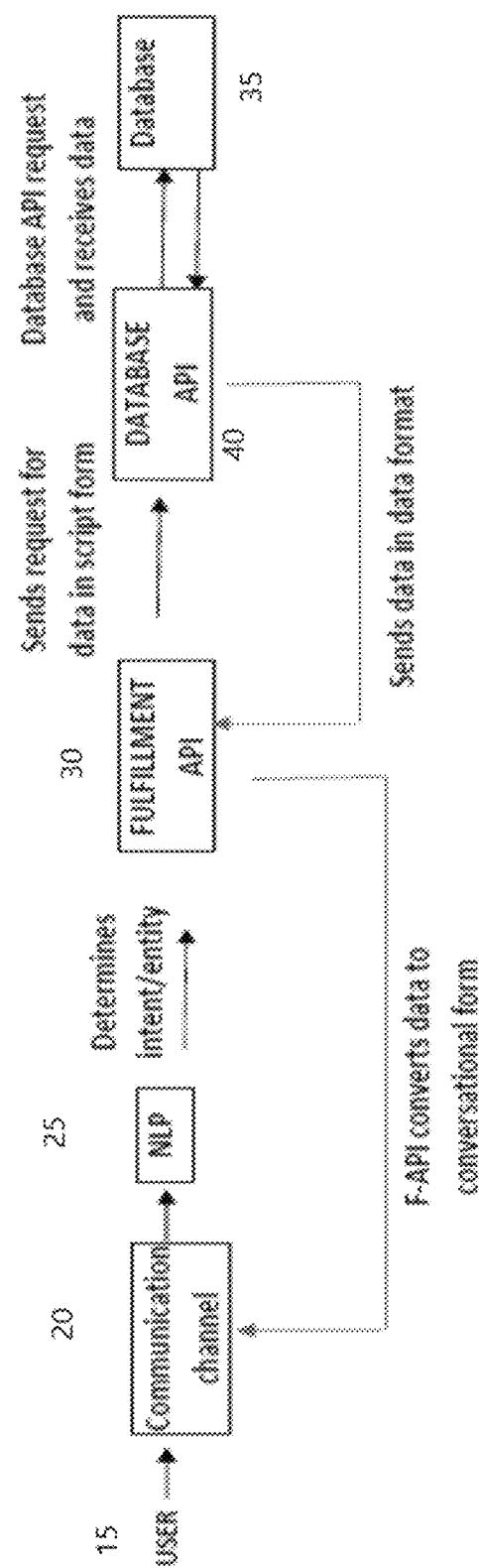
FIG. 2 illustrates a more detailed view of the system architecture shown in FIG. 1.

FIG. 1 illustrates an overview of a system architecture of an embodiment of the conversational business tool (10). FIG. 2 illustrates a more detailed view of the system architecture shown in FIG. 1.

With reference to both FIGS. 1 and 2, a user (15) initiates a conversation by providing an utterance via a communication channel (20) in a device. The communication channel may be any type of channel that conveys utterances to a Natural Language Processor (NLP) (25). For example, the communication channel (20) may be a conversational virtual assistant (e.g. Siri®, Alexa®, Cortana®, etc.), Skype®, etc. The device may be a smart phone, a tablet, a laptop, a smart speaker, etc. The NLP (25) determines aspects of the utterance, such as intent and entities, which are then communicated to a Fulfillment Application Programming Interface (F-API) (30). The F-API (30) converts the intent to specific data requests, which are then communicated to a Database API (40) which is in communication with a business database (35). An example of the Database API (40) includes a RESTful API. The data associated with a specific intent is then retrieved from the database (35), and sent via the Database API (40) to the F-API, which in turn, draws insights, checks multiple cases and finds data that stands out; it then converts this information to conversational form which is then communicated to the user (15) via the communication channel (20). The business database may be part of a larger business software platform—for example, a supply chain management software platform, such as a rapid response platform as defined above.

FIG. 2A summarizes the function of an NLP and illustrates a pseudocode of an embodiment of the conversational business tool. The NLP undergoes training in order to classify utterances into the correct intent. Training includes positive reinforcement when the system correctly identifies intents and negative reinforcement when it is wrong. Such training enables the conversational business tool to handle user utterances in in the future.

The pseudo code of the Fulfillment API basically takes a user query (utterance), matches intent to a function, obtains the appropriate data, forms the response and sends the response to the user.

Figure 3:
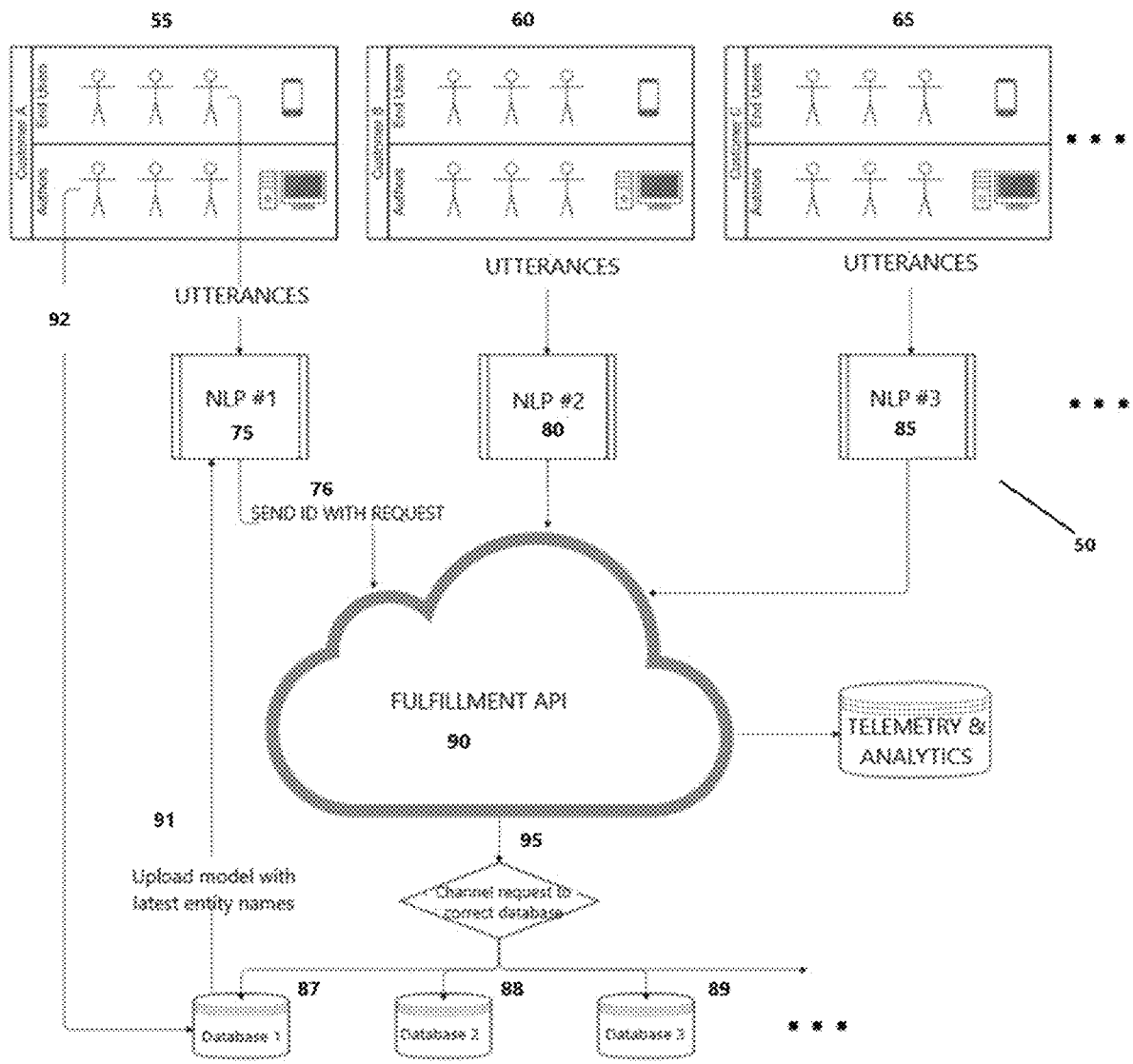
FIG. 3 illustrates a system architecture of another embodiment of the conversational business tool.

FIG. 3 illustrates a system architecture (50) of another embodiment of the conversational business tool, in which multiple different customers (55, 60, 65) use the tool simultaneously. Specifically, FIG. 3 illustrates scalable, multi-tenant architecture to support customized business metrics and multiple customers. Each customer (55, 60, 65) accesses a respective individual NLP (75,80, 85) that is customized for that particular customer. Each NLP (75,80, 85) communicates with a common Fulfillment API (90), marking the conversation with identification for the particular customer (76), which the F-API uses to correctly (95) channel data requests to the respective correct customer database (87, 88, 89). In addition, a customer's database updates names of entities (91) to the customer's NLP (75). Where a rapid response system is used, the command (92) is given to generate data resources that can be calculated sufficiently quickly.

Figure 4:
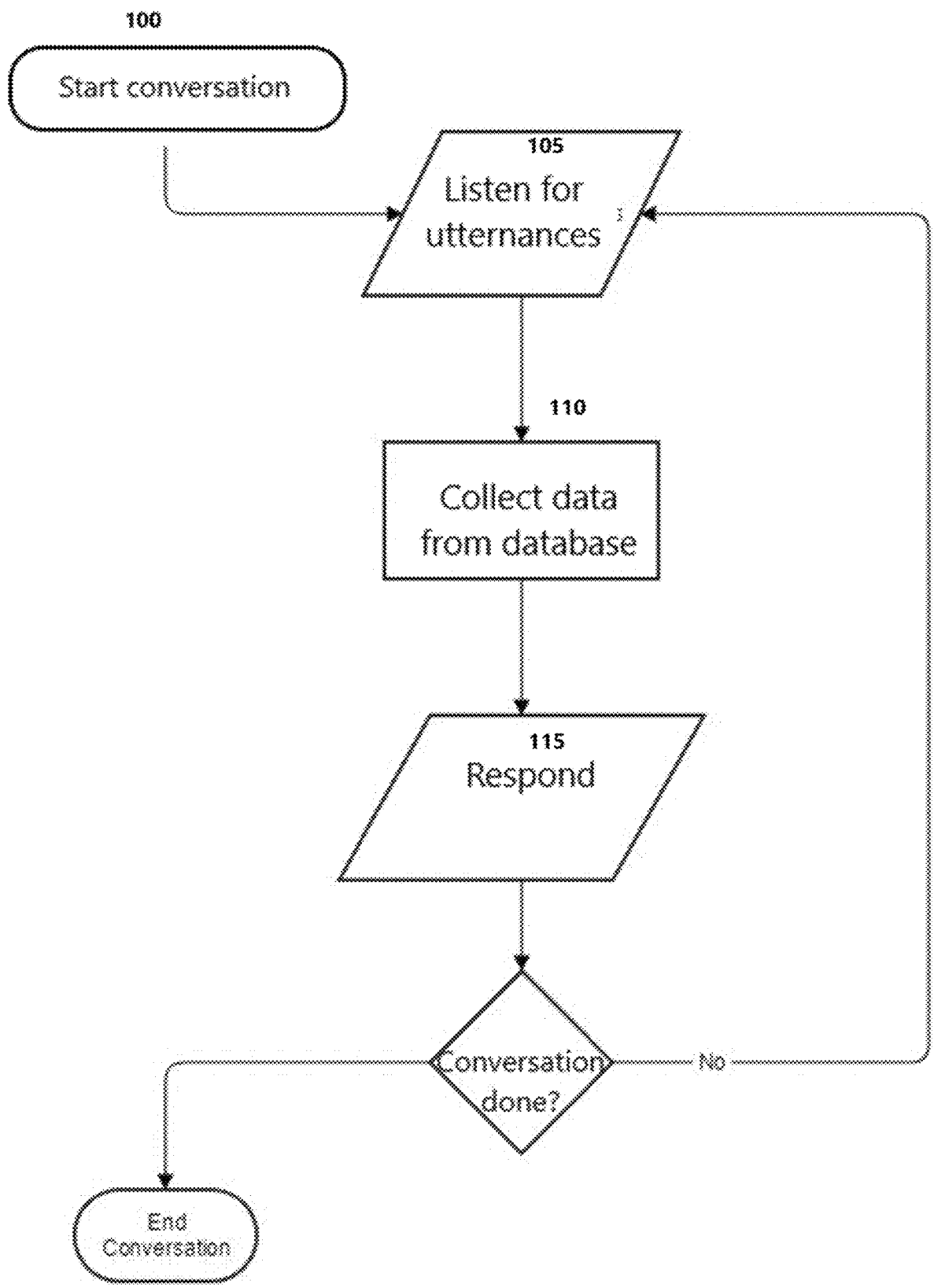
FIG. 4 illustrates a master flowchart of an embodiment of the conversational business tool.

FIG. 4 illustrates a master flowchart of an embodiment of the conversational business tool. A conversation (100) starts with a first utterance (105), which is converted (110) to a request for data from the database, followed by a response (115) to the first utterance. If the conversation is incomplete, the process is repeated until the conversation ends.

Figure 5:
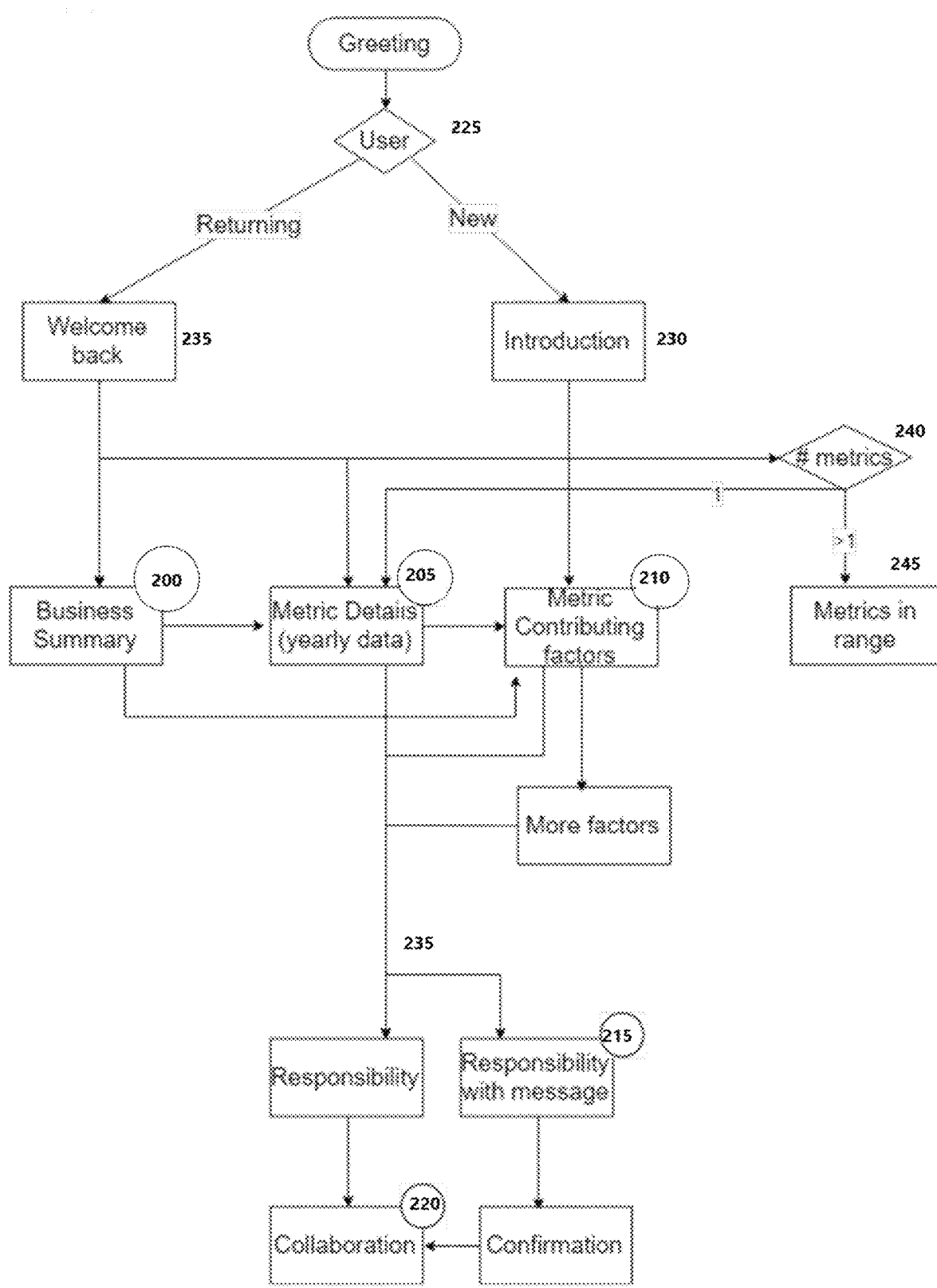
FIG. 5 illustrates a detailed flowchart of an embodiment of a conversational business tool comprising five submodules.

FIG. 5 illustrates a detailed flowchart of an embodiment of the conversational business tool comprising five submodules (200, 205, 210, 215, 220). The user (225) is greeted, and is provided with an introduction (230) is s/he is new; or welcomed back (235) if s/he is returning. At this juncture, there are three conversational modules available—one that provides a business summary (200); one that provides reporting on a specific metric (205); and a third that provides contributing factors (210) to the reported metric. The modules are configured to interact, depending on the request of the user (225).

For example, the user may initially request a business summary (200), followed by a request for a specific metric (205) (e.g. revenue, inventory, etc), followed by a request for contributing factors (210) for that metric. Or the user may request a business summary (200) followed by a request for contributing factors (210) of a specific metric (i.e. bypass the request for a specific metric). Or, a user may simply request a summary of a specific metric (205), followed by a request for details of that metric (210).

Figure 8:
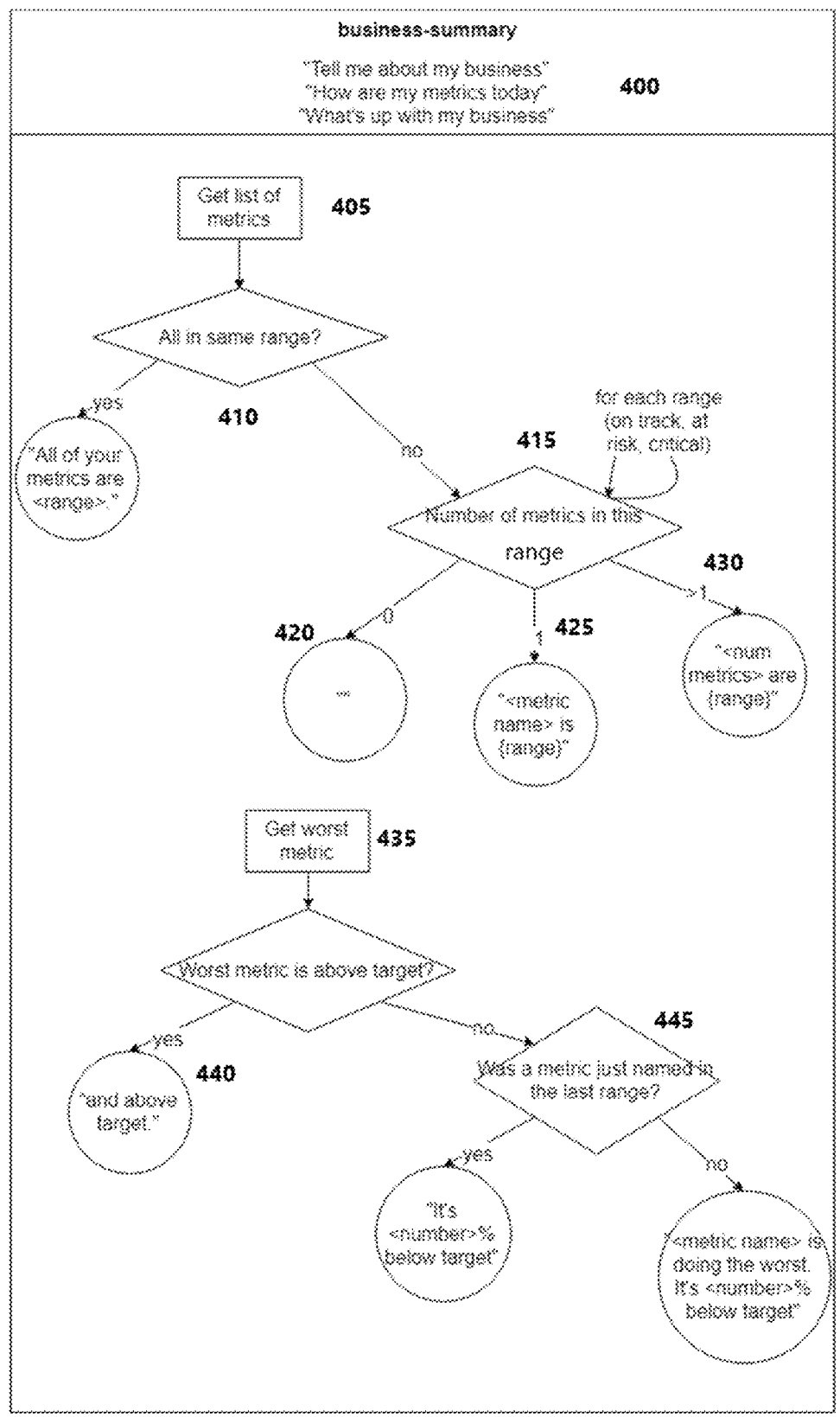
FIG. 8 illustrates further details of the subroutine portion highlighted by the dotted square in FIG. 7.

The business summary (200) can provide a list of metrics (240), and may classify the metrics in different ranges (245), as discussed in greater detail in FIG. 8.

The user may then want to contact (235) an individual responsible for a particular metric, so that a collaboration (220) may begin to address the particular metric. A responsibility-with-message module (215) can be used to compose a message that is verified by the user, and then sent to the responsible individual. A further collaboration module (220) can be used to initiate collaboration between authorized personnel to address issues provided by the business analysis. The collaboration module (220) is used, provided the supply chain planning platform supports collaboration.

FIG. 6 illustrates a dialogue comprising a series of conversational turns in an embodiment of the conversational business tool, in which the modules shown in FIG. 5 are used. In addition, the tool is integrated with a supply chain planning platform that provides for rapid processing of business metrics and scenario simulations; i.e. the "rapid response" platform defined above.

The user has requested a report for the day. A summary is provided orally, while a summary graphic can be provided on the device used by the user to access the tool. The user then asks for a future forecast of a specific metric (utilization), which the tool is able to provide instantaneously due to its integration with the rapid reply supply chain planning platform described above. The user then requests a summary report of another specific metric (revenue), followed by a request for contributing factors. This is reported orally, and also includes a graphic (i.e. pie chart) for easy visualization. More information regarding contributing factors is requested by the user. The tool responds with two more factors. These responses are up-to-date and instantaneous due to the integration of the tool with the aforementioned platform.

The user then requests action in the form of a request to contact the appropriate personnel. The tool provides the appropriate contact information and composes a draft message for review by the user. Once confirmed, the message is sent. The tool checks to see if the user requests anything further.

Figure 7:
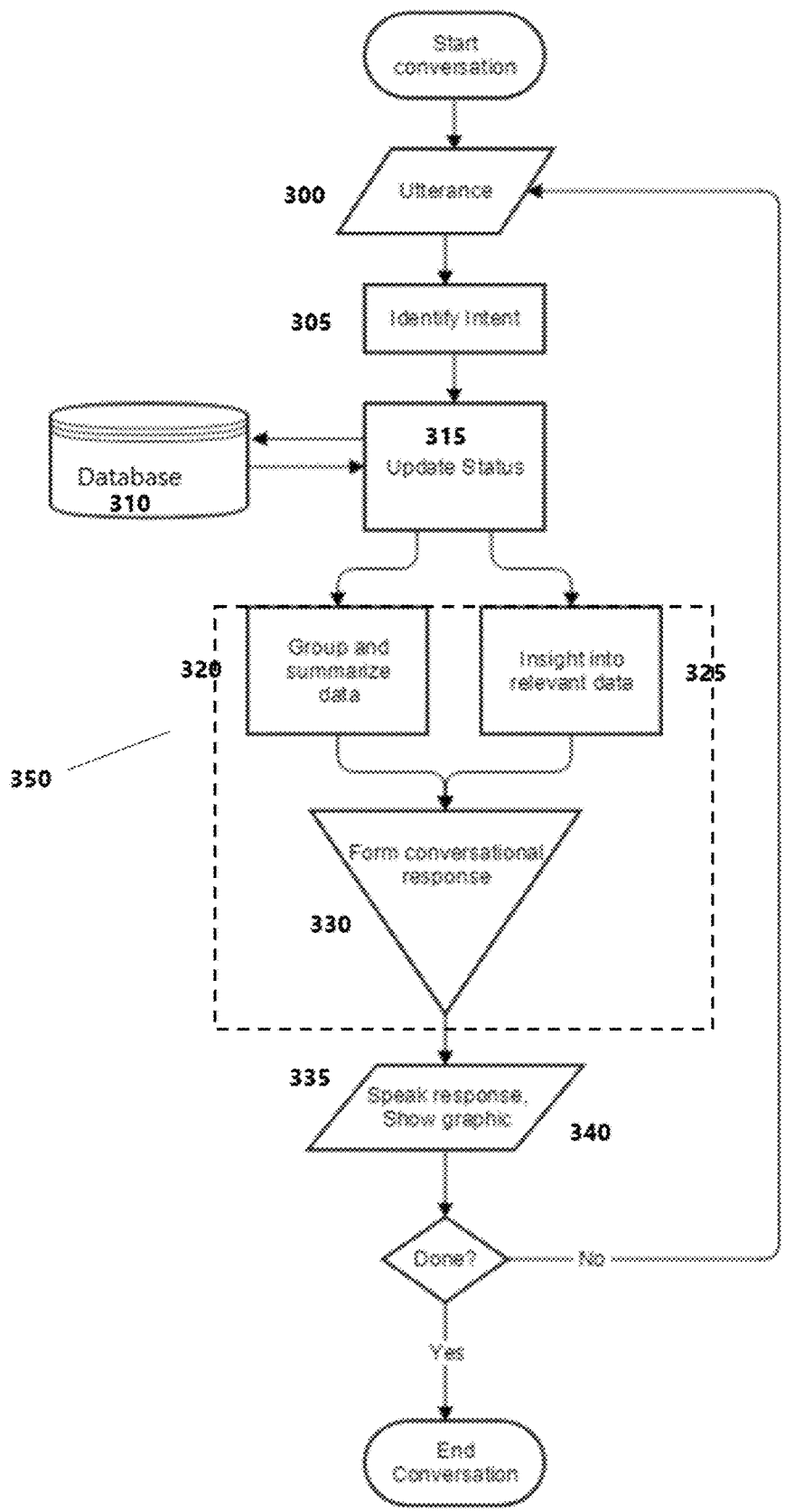
FIG. 7 illustrates a flowchart of a subroutine comprising the business summary module shown in FIG. 5.

FIG. 7 illustrates a flowchart of a subroutine comprising the business summary module (200) shown in FIG. 5. In this subroutine, a basic intent (305) is deduced from the utterance (300). The intent may be selected from a class of intents—for example, a question, a command to get data, a response, etc. Once the intent (305) is deduced, this triggers a step to establish which data to retrieve from the database (310). The Fulfillment API stores the most up to date status data locally. After identifying the intent (305), the F-API updates the status of its data via a command to the database, as denoted by the step "Update Status" (315).

Data is retrieved in two forms: an overview of the data (320) and insights (325) into the relevant data (e.g. business metrics such as revenue, inventory, utilization, margins, KPIs, etc). This is then designed into a conversational response (330) which is conveyed to the communication channel (335). There is an option of providing graphics (340) to accompany the response. The user then determines whether to end the conversation or continue to ask further questions.

FIG. 8 illustrates further details of the subroutine portion (350) highlighted in FIG. 7. The business summary routine is initiated by a general verbal query (400), examples of which are shown in the upper box. The subroutine then obtains a list of metrics (405) and groups the metrics by range (410). As an example, there can be three ranges: whether a metric is on track (i.e. compared to targets), warrants a risk warning, or is in a critical state (i.e. 'on-track', 'warning', 'critical'). A breakdown (415) of metrics in each range can be reported. For example, if there are no metrics in a given range, this range is skipped (420). If there is 1 metric in the range (425), the user interface replies to that effect. If there is more than one metric in the range (430), the response is to that effect. For example, for the range "on-track", if only revenue is on track, then the conversational user interface replies "revenue on track". If, say revenue and inventory are on track, the conversational user interface replies "revenue and inventory are on track". Subsequently, subroutine obtains (435) details on the metric that has the poorest performance in relation to its target. The user is informed whether the worst-performing metric is above target (440) or below target (445).

Figure 9:
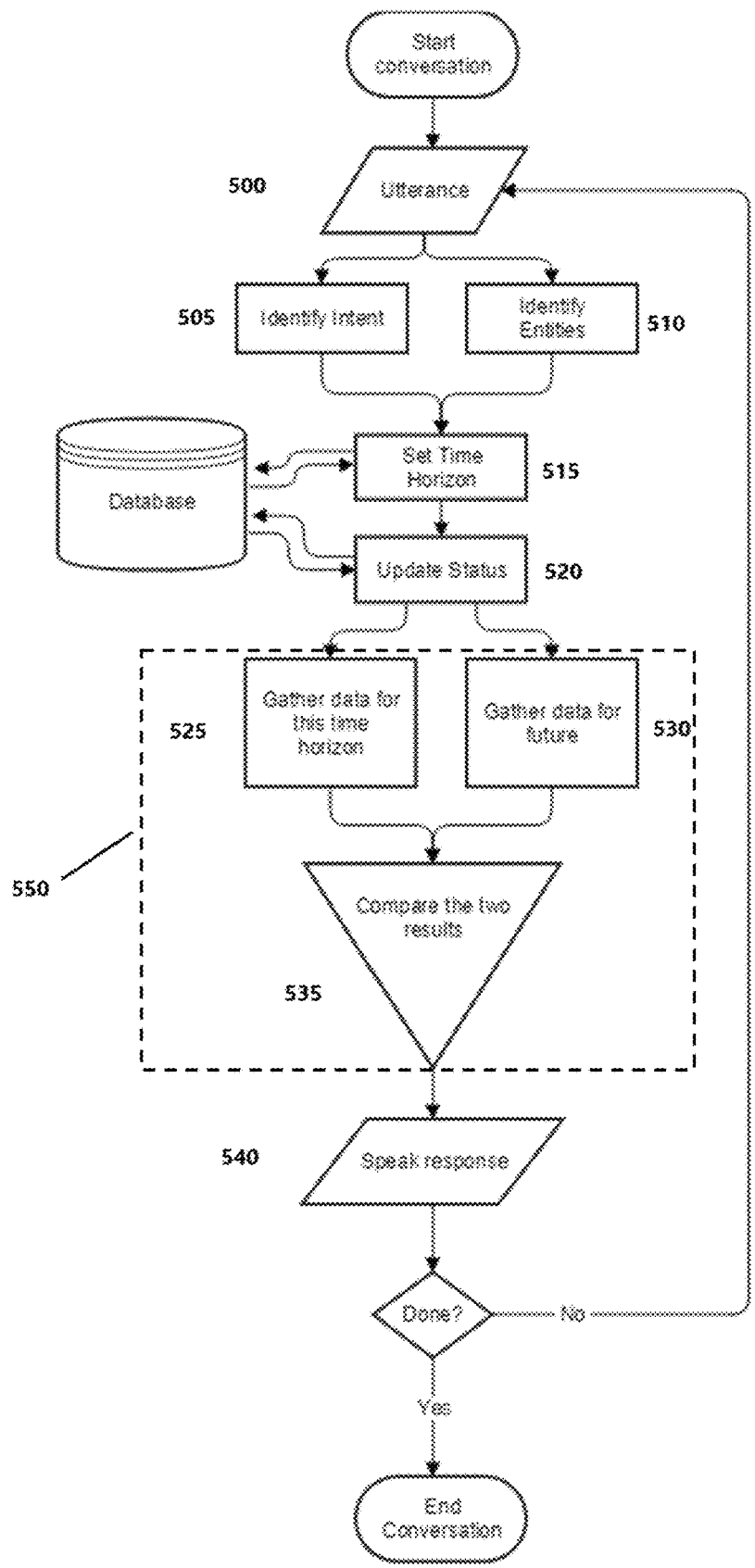
FIG. 9 illustrates a flowchart of a subroutine comprising the metric detail module shown in FIG. 5.

FIG. 9 illustrates a flowchart of a subroutine comprising the metric detail module (205) shown in FIG. 5.

In this module, both a basic intent (505) and an entity (510) are identified from the utterance (500). For example, an entity (510) may be revenue, while the intent (505) may be "get data" related to the entity (510). This directs the tool to perform the intent (505) function related to the entity (510). In an example, this may mean to get data about revenue. Since most entities are reported in different time horizons (e.g. monthly, quarterly, yearly; current, previous year, etc), the time horizon (515) is set, after which the status is updated (520).

Data is then gathered (525) for the current time horizon, and data calculated for future time horizons is also retrieved (530). This step (of obtaining calculated data) relies on a command being sent to the supply chain planning platform to calculate the appropriate metrics for the future. As such, a meaningful result is obtained if the tool is integrated into a rapid reply platform, as described above. The results are then compared (535), and relayed in conversational form (540) to the user.

Figure 10:
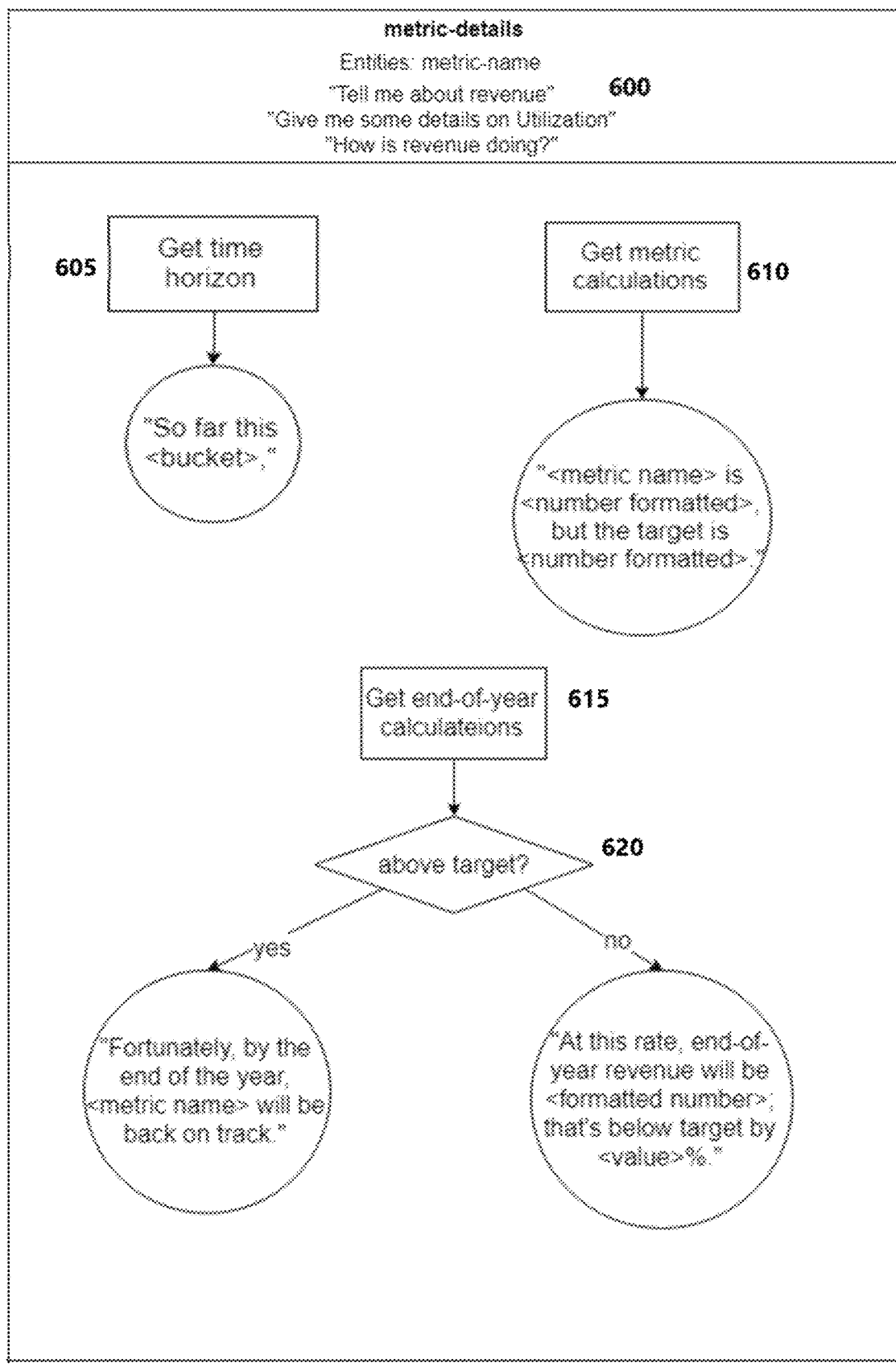
FIG. 10 illustrates further details of the subroutine portion highlighted by the dotted square in FIG. 9.

FIG. 10 illustrates further details of the subroutine portion (550) highlighted by the dotted square in FIG. 9. The metric-details subroutine is triggered by a query (600) about a particular metric, and the entities are a metric name. Examples of metrics include revenue, utilization, margin, inventory, etc. The subroutine can have three steps: get time horizon (605), get metric calculations (610), and get end of year calculations (615), which are executed sequentially. First a time horizon is chosen (605); the time horizon may be monthly, quarterly, yearly or the previous year's data. For example the bucket could be quarterly data, yearly data or last year's data. The 'get metric calculation' (610) will check the calculated values for a metric and compare with the actual value. For example "Revenue is $6.2 million but the target is $5 million". Finally the future predictions (615) are given by retrieving results of scenario simulations, found for example, in a supply chain planning platform such as "rapid response", and compared with the target (620).

Figure 11:
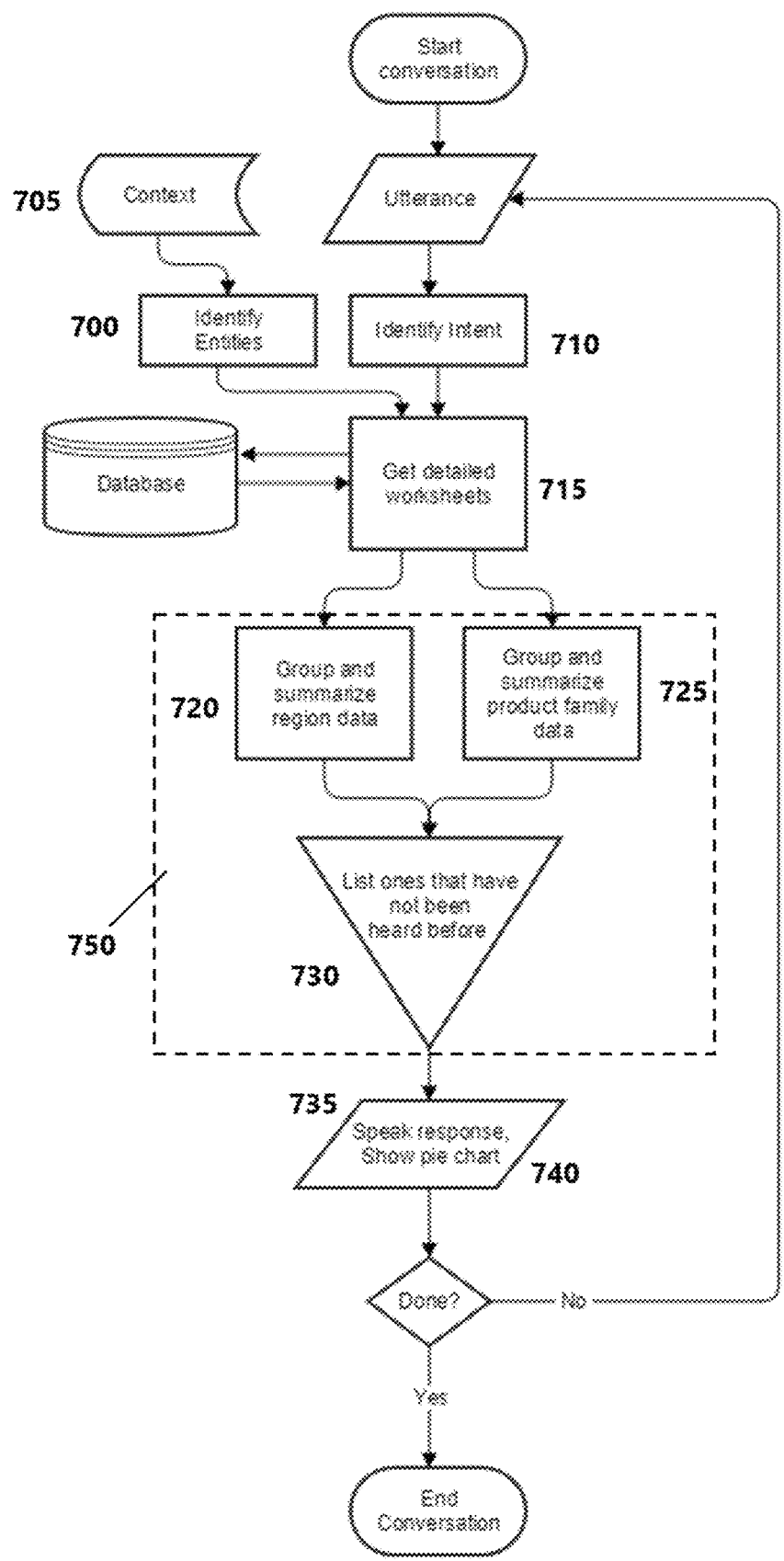
FIG. 11 illustrates a flowchart of a subroutine comprising the metric contributing factors module shown in FIG. 5.

FIG. 11 illustrates a flowchart of a subroutine comprising the metric contributing factors module (210) shown in FIG. 5.

This module is accessed following either the business summary module (200) and/or the metric detail module (205), in which a metric (i.e. entity) has been identified (700). The preceding dialogue has been stored as "context" (705)— thus the entity (700) is already identified. The intent is deduced (710). For example, the intent (710) may be a question (e.g. "why"?). Once deduced, detailed information is retrieved (715) from the database, in which regional data (720) and product family data (725) are each grouped and summarized. While the full summary and grouping can be reported in conversational form, in order to avoid repetition, only that data which has not been previously conveyed (730), is provided to the user in a conversational form (735), and optionally with a graphic (740).

Figure 12:
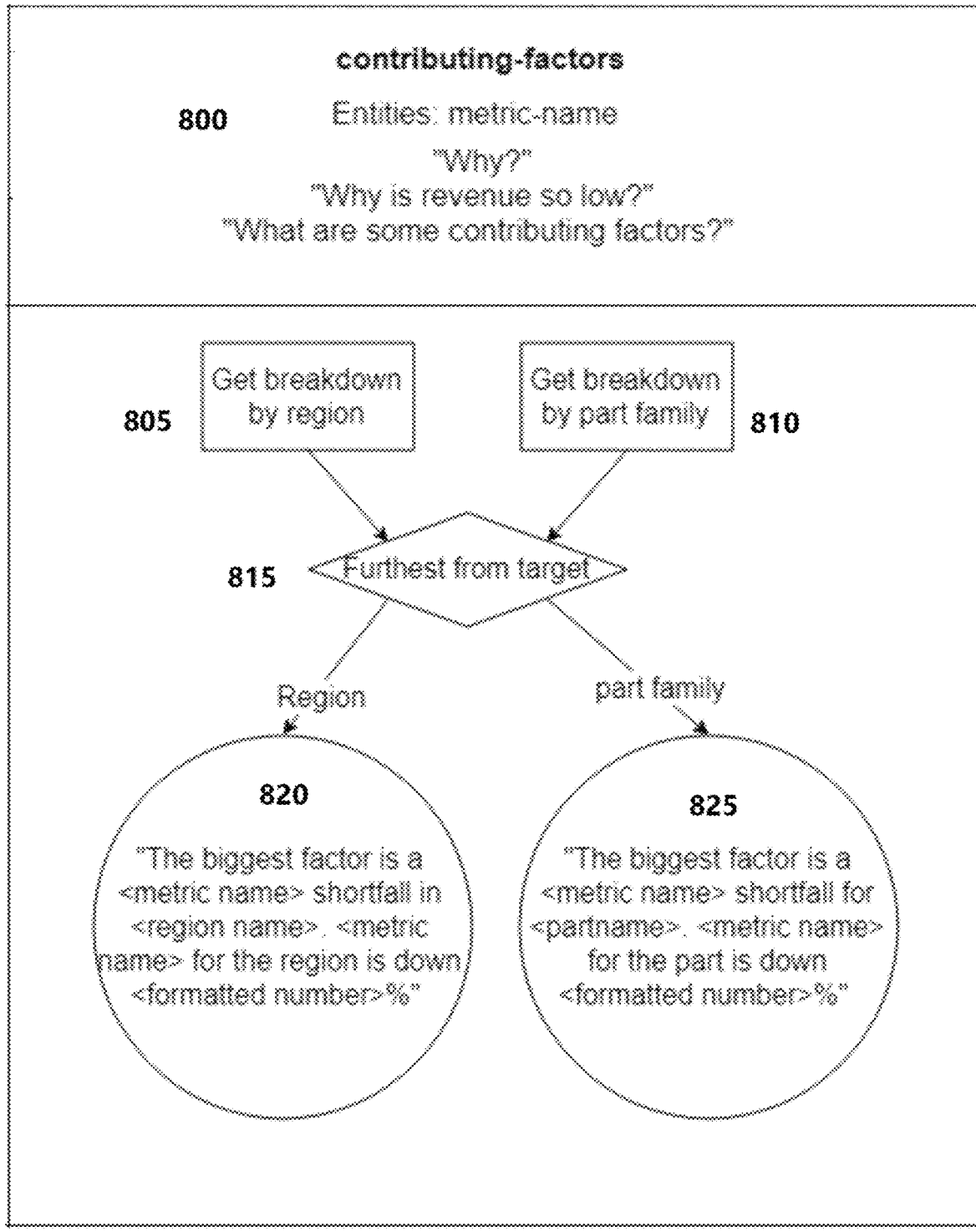
FIG. 12 illustrates further details of the subroutine portion highlighted by the dotted square in FIG. 11.

FIG. 12 illustrates further details of the subroutine portion highlighted (750) by the dotted square in FIG. 11. The intent and entities (800) have been previously identified, and as such, further details/analysis of the metrics is provided in this contributing-factors subroutine. Different filters may be applied to the data (e.g. filter by region, by part, etc.) to find the areas in which a metric diverges from its target the most, since these will be of highest interest to the user. In FIG. 12, for example, a region filter (805) and a parts filter (810) have been selected. The region and the part for the selected metric that are the furthest (815) from their respective target are highlighted to the user through the speech examples (820, 825) shown.

Figure 13:
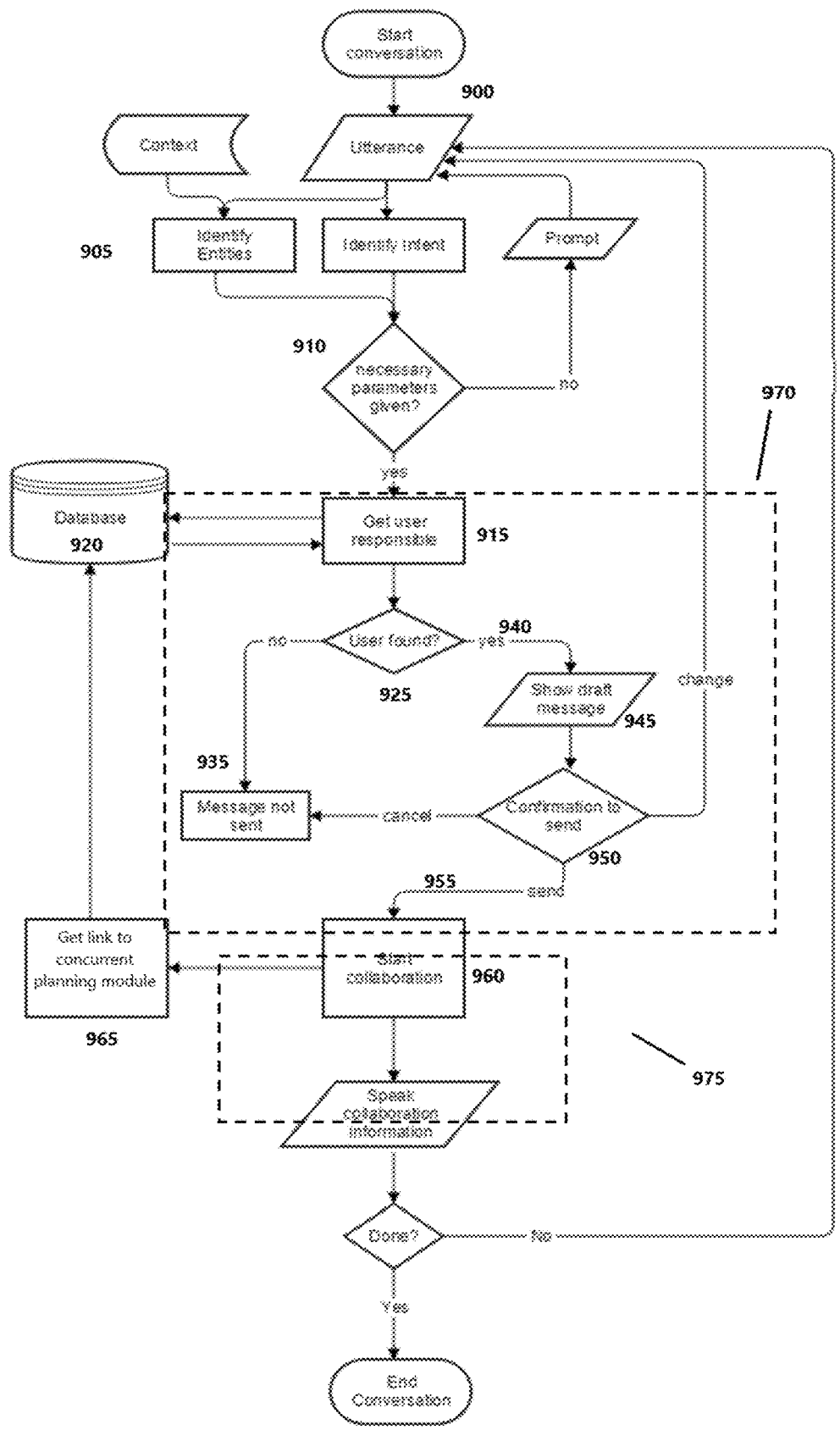
FIG. 13 illustrates a flowchart of a subroutine comprising the 'responsibility with message' and 'collaboration' modules shown in FIG. 5.

FIG. 13 illustrates a flowchart of a subroutine comprising the responsibility-with-message (215) and collaboration modules (220) shown in FIG. 5. The utterance (900) in this conversation turn includes entities (905) for a metric name, a region name and a part name. Once the necessary parameters (910) are given, the module requests (915) a name of the requested responsible individual from the database (920). If no such person (925) is found in the database (920), a message is not sent (935). If such a person is found (940) in the database (920), a draft message is composed (945) for verification (950) by the user. Once approved (955), a further module can initiate collaboration (960) between authorized personnel to address any metrics issue, provided the supply chain planning platform supports (965) collaboration in the form of concurrent planning.

Figure 14:
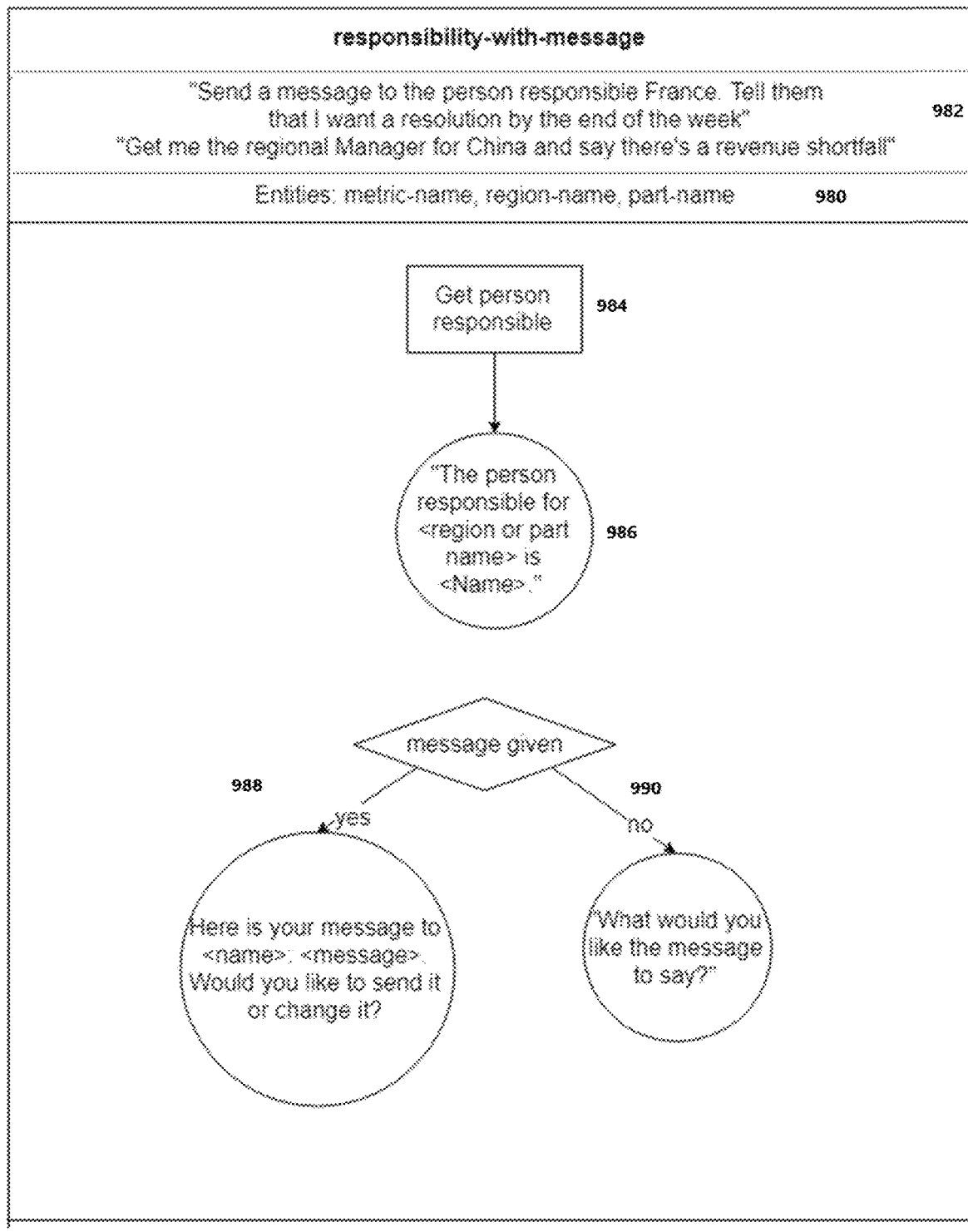
FIG. 14 illustrates further details of the subroutine portion highlighted by the upper dotted square in FIG. 13.

FIG. 14 illustrates further details of the subroutine portion highlighted by the upper dotted square (970) in FIG. 13. The responsibility-with-message module is triggered by a combination of intents and specific entities of a metric name, and filters of the metric (980) (in FIG. 13, the example of region and parts filters are used). Examples of utterances (982) for this module are provided at the top. After successfully obtaining the responsible individual (984) from the database, the tool audibly conveys the information in a conversation format (986) to the user. This is followed by either a draft message (988) (to send to the responsible individual) or a query (990) to the user to compose a message to be sent.

Figure 15:
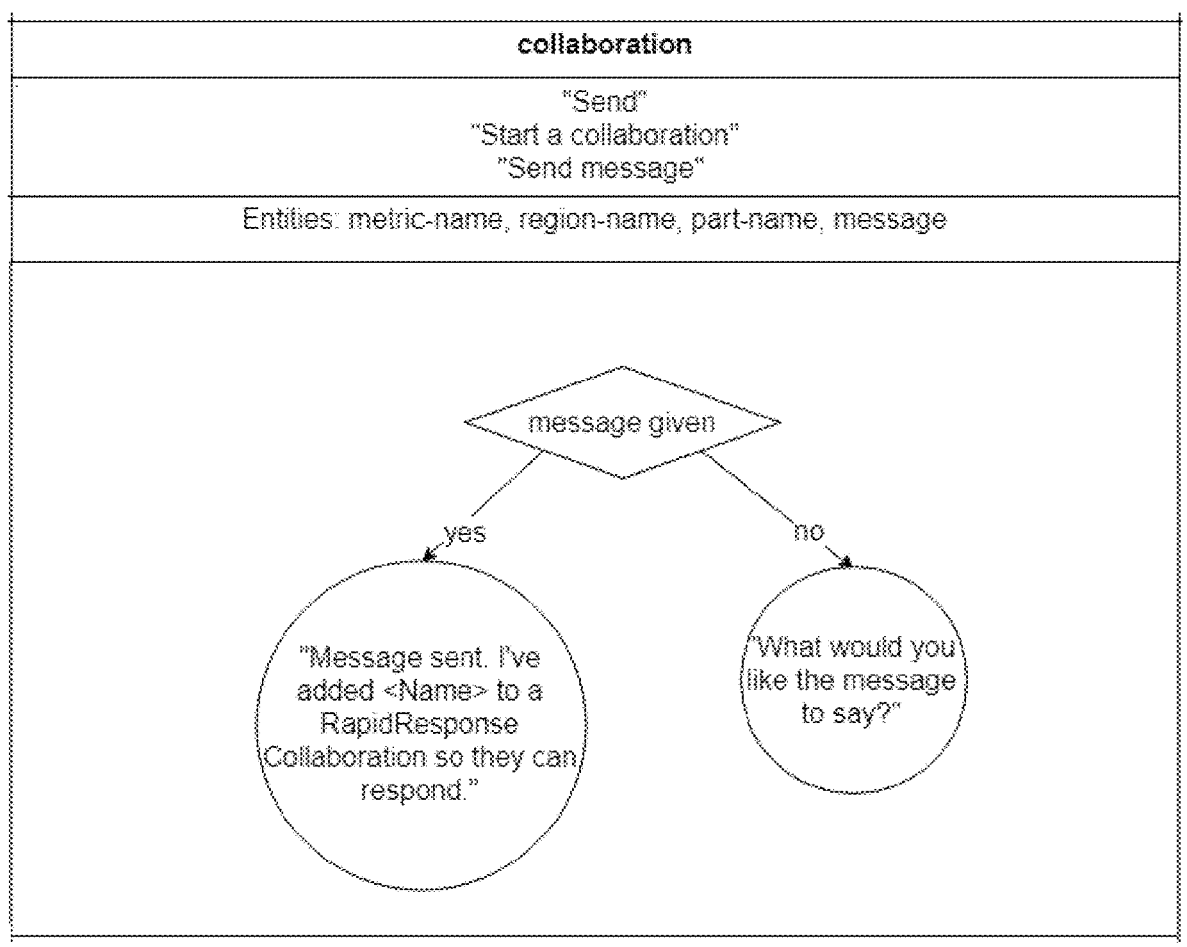
FIG. 15 illustrates further details of the subroutine portion highlighted by the lower dotted square in FIG. 13.

FIG. 15 illustrates further details of the collaboration subroutine portion highlighted by the lower dotted square (975) in in FIG. 13. The collaboration module is triggered by a combination of intent and specific entities of a metric name, a region name, part name and message. Examples of utterances for this module are provided at the top. After successfully sending the message composed in the previous module, the tool conveys to the user that confirmation that collaboration has been initiated.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

The invention claimed is:

1. A computer-implemented method comprising:
   deducing, by an individual Natural Language Processor (NLP), an intent and one or more entities from an oral query, wherein the individual NLP is custom to an NLP user;
   communicating the intent and the one or more entities from the individual NLP to a common Fulfillment Application Program Interface (F-API), wherein the common F-API is operatively connected to a plurality of the individual NLPs
   obtaining, by the common F-API from a database application program interface (D-API) in operative communication with the common F-API, a first set of data associated with the intent and the one or more entities from a database associated with the individual NLP, wherein the common F-API converts the intent to a specific data request, which is then communicated to the D-API;
   in response to a first type of intent:
      comparing, by a processor, data related to the one or more entities for a time horizon with data related to the one or more entities for a future time horizon; and
      forming, by the processor, a first conversational response to a user comprising a comparison of the data related to the one or more entities for a time horizon with the data related to the one or more entities for a future time horizon;
   in response to a second type of intent:
      identifying, by the processor, a subset of the one or more entities based on a previous dialogue involving the first conversational response;
      obtaining, by the processor, further information about the subset of the one or more entities;
      grouping and summarizing, by the processor, data related to the subset; and
      forming, by the processor, a second conversational response to the user comprising information about data that has not been previously conveyed by the first conversational response; and
   sending, by the common F-API, each of the first and second conversational responses for voice output through a communication channel to a user device associated with the individual NLP.

2. The computer-implemented method of claim 1, further comprising:
   providing, by the processor, a current performance of a business metric in the time horizon;
   comparing, by the processor, the current performance of the business metric to a performance target thereof; and
   providing, by the processor, a future projection of the business metric.

3. The computer-implemented method of claim 1, further comprising:
   obtaining, by the processor, a breakdown of the subset according to one or more filters; and
   determining, by the processor, a business metric that is furthest from a projected target thereof within each of the one or more filters.

4. The computer-implemented method of claim 1 further comprising:
   in response to a third type of intent:
      providing, by the processor, a name of an individual to address a subset of a business metric that is performing below a projected target thereof;
      sending, by the processor, a communication to the individual; and
      initiating, by the processor, collaboration with the individual to address the subset of the business metric that is performing below the projected target.

5. The computer-implemented method of claim 1, wherein the database forms part of a supply chain planning platform that provides rapid processing of business metrics, rapid processing of scenario simulations, and up-to-date analytics in response to the oral query, and the method further comprises, when the first set of data associated with the intent and the one or more entities from the database is obtained by the common F-API from the D-API, locally storing the respective data at the common F-API.

6. The computer-implemented method of claim 1, wherein:
the communication channel is housed in a device comprising a screen; and wherein the method further comprises:
converting, by the processor, the data associated with the intent and the one or more entities to a visualized form for presentation on the screen.

7. A system comprising:
a processor; and
a memory storing instructions that, when executed by the processor, configure the system to:
deduce, by a Natural Language Processor (NLP), an intent and one or more entities from an oral query, wherein the individual NLP is custom to an NLP user;
communicate the intent and the one or more entities from the individual NLP to a common Fulfillment Application Program Interface (F-API), wherein the common F-API is operatively connected to a plurality of the individual NLPs
obtain, by the common F-API from a database application program interface (D-API) in operative communication with the common F-API, a first set of data associated with the intent and the one or more entities from a database associated with the individual NLP, wherein the common F-API converts the intent to a specific data request, which is then communicated to the D-API;
in response to a first type of intent:
compare, by the processor, data related to the one or more entities for a time horizon with data related to the one or more entities for a future time horizon; and
form, by the processor, a first conversational response to a user comprising a comparison of the data related to the one or more entities for a time horizon with the data related to the one or more entities for a future time horizon;
in response to a second type of intent:
identify, by the processor, a subset of the one or more entities based on a previous dialogue involving the first conversational response;
obtain, by the processor, further information about the subset;
group and summarize, by the processor, data related to the subset of the one or more entities; and
form, by the processor, a second conversational response to the user comprising information about data that has not been previously conveyed by the first conversational response; and
send, by the common F-API, each of the first and second conversational responses for voice output through a communication channel to a user device associated with the individual NLP.

8. The system of claim 7, wherein the instructions further configure the system to:
provide, by the processor, a current performance of a business metric in the time horizon;
compare, by the processor, the current performance of the business metric to a performance target thereof; and
provide, by the processor, a future projection of the business metric.

9. The system of claim 7, wherein the instructions further configure the system to:

obtain, by the processor, a breakdown of the subset according to one or more filters; and
determine, by the processor, a business metric that is furthest from a projected target thereof within each of the one or more filters.

10. The system of claim 7, wherein the instructions further configure the system to:
in response to a third type of intent:
provide, by the processor, a name of an individual to address a subset of a business metric that is performing below a projected target thereof;
send, by the processor, a communication to the individual; and
initiate, by the processor, collaboration with the individual to address the subset of the business metric that is performing below the projected target.

11. The system of claim 7, wherein the database forms part of a supply chain planning platform that provides rapid processing of business metrics, rapid processing of scenario simulations, and up-to-date analytics in response to the oral query, and the instructions further configure the system to, when the first set of data associated with the intent and the one or more entities from the database is obtained by the common F-API from the D-API, locally storing the respective data at the common F-API.

12. The system of claim 7, wherein:
the communication channel is housed in a device comprising a screen; and wherein the instructions further configure the system to:
convert, by the processor, the data associated with the intent and the one or more entities to a visualized form for presentation on the screen.

13. A non-transitory computer-readable storage medium, the computer-readable storage medium including instructions that when executed by a computer, cause the computer to:
deduce, by a Natural Language Processor (NLP), an intent and one or more entities from an oral query, wherein the individual NLP is custom to an NLP user;
communicating the intent and the one or more entities from the individual NLP to a common Fulfillment Application Program Interface (F-API), wherein the common F-API is operatively connected to a plurality of the individual NLPs;
obtain, by the common F-API from a database application program interface (D-API) in operative communication with the common F-API, a first set of data associated with the intent and the one or more entities from a database associated with the individual NLP, wherein the common F-API converts the intent to a specific data request, which is then communicated to the D-API;
in response to a first type of intent:
compare, by a processor, data related to the one or more entities for a time horizon with data related to the one or more entities for a future time horizon; and
form, by the processor, a first conversational response to a user comprising a comparison of the data related to the one or more entities for a time horizon with the data related to the one or more entities for a future time horizon;
in response to a second type of intent:
identify, by the processor, a subset of the one or more entities based on a previous dialogue involving the first conversational response;
obtain, by the processor, further information about the subset of the one or more entities;

group and summarize, by the processor, data related to the subset; and form, by the processor, a second conversational response to the user comprising information about data that has not been previously conveyed by the first conversational response; and send, by the common F-API, each of the first and second conversational responses for voice output through a communication channel to a user device associated with the individual NLP.

14. The computer-readable storage medium of claim 13, wherein the instructions further configure the computer to:

provide, by the processor, a current performance of a business metric in the time horizon;

compare, by the processor, the current performance of the business metric to a performance target thereof; and provide, by the processor, a future projection of the business metric.

15. The computer-readable storage medium of claim 13, wherein the instructions further configure the computer to:

obtain, by the processor, a breakdown of the subset according to one or more filters; and determine, by the processor, which business metric is furthest from a projected target thereof within each of the one or more filters.

16. The computer-readable storage medium of claim 13:

in response to a third type of intent:

provide, by the processor, a name of an individual to address a subset of a business metric that is performing below a projected target thereof;

send, by the processor, a communication to the individual; and initiate, by the processor, collaboration with the individual to address the subset of the business metric that is performing below the projected target.

17. The computer-readable storage medium of claim 13, wherein the database forms part of a supply chain planning platform that provides rapid processing of business metrics, rapid processing of scenario simulations, and up-to-date analytics in response to the oral query, wherein the instructions further configure the system to, when the first set of data associated with the intent and the one or more entities from the database is obtained by the common F-API from the D-API, locally storing the respective data at the common F-API.

18. The computer-readable storage medium of claim 13, wherein:

the communication channel is housed in a device comprising a screen;

and wherein the instructions further configure the computer to:

convert, by the processor, the data associated with the intent and the one or more entities to a visualized form for presentation on the screen.

* * * * *